United States Patent
Atcitty et al.

(10) Patent No.: US 11,916,511 B1
(45) Date of Patent: Feb. 27, 2024

(54) SOLAR-BATTERY INTEGRATED DC SYSTEM

(71) Applicants: National Technology & Engineering Solutions of Sandia, LLC, Albuquerque, NM (US); Urban Electric Power, Pearl River, NY (US); Arrowhead Center, Inc., Las Cruces, NM (US)

(72) Inventors: Stanley Atcitty, Albuquerque, NM (US); Valerio De Angelis, Santa Barbara, CA (US); Satishkumar J. Ranade, Las Cruces, NM (US); Sijo Augustine, Las Cruces, NM (US); Nataraj Pragallapati, Edison, NJ (US); Olga Lavrova, Las Cruces, NM (US)

(73) Assignees: National Technology & Engineering Solutions of Sandia, Albuquerque, NM (US); Arrowhead Center, Inc., Las Cruces, NM (US); Valerio De Angelis, Santa Barbara, CA (US)

( * ) Notice: Subject to any disclaimer, the term of this patent is extended or adjusted under 35 U.S.C. 154(b) by 0 days.

(21) Appl. No.: 17/500,632

(22) Filed: Oct. 13, 2021

Related U.S. Application Data

(60) Provisional application No. 63/090,810, filed on Oct. 13, 2020.

(51) Int. Cl.
*H02J 7/00* (2006.01)
*H02S 40/32* (2014.01)
*H02S 40/38* (2014.01)

(52) U.S. Cl.
CPC ............ *H02S 40/32* (2014.12); *H02J 7/0068* (2013.01); *H02S 40/38* (2014.12); *H02J 2300/26* (2020.01)

(58) Field of Classification Search
CPC ........ H02S 40/32; H02S 40/38; H02J 7/0068; H02J 2300/26
(Continued)

(56) References Cited

U.S. PATENT DOCUMENTS

| | | |
|---|---|---|
| 10,312,693 B2 | 6/2019 | McMorrow et al. |
| 10,581,266 B2 | 3/2020 | Somani et al. |

(Continued)

FOREIGN PATENT DOCUMENTS

| | | | | |
|---|---|---|---|---|
| WO | WO-2015128359 A1 | * | 9/2015 | ............... H02J 3/32 |
| WO | 2018213157 A1 | | 11/2018 | |
| WO | 2019036325 A1 | | 2/2019 | |

*Primary Examiner* — Zixuan Zhou
(74) *Attorney, Agent, or Firm* — Daniel J. Jenkins

(57) ABSTRACT

A DC bus is connected to a PV array, a battery or both, to power a grid connected inverter load on the bus. A system and method is described for controlling current flow on a DC bus regardless of the type of inverter. A converter receives a DC battery voltage. A switching module controls current flow through the converter. A current generator generates a reference current in response to a reference voltage. A comparator connected at the output of the current generator compares the reference current with a battery current and outputs a signal to a controller. The controller generates a reference value. A PWM generator modulates the switch module to control current flow and energy flow between the DC bus and the battery. The current from the DC bus to the inverter is controlled to allow proper grid-connected operation regardless of inverter type.

19 Claims, 4 Drawing Sheets

(58) Field of Classification Search
USPC .......................................................... 320/101
See application file for complete search history.

(56) References Cited

U.S. PATENT DOCUMENTS

| | | | |
|---|---|---|---|
| 2006/0171182 A1* | 8/2006 | Siri ................... | H02M 3/33592 |
| | | | 363/131 |
| 2011/0115295 A1* | 5/2011 | Moon ....................... | H02J 3/32 |
| | | | 307/65 |
| 2011/0273130 A1* | 11/2011 | Lee ........................... | H02J 3/44 |
| | | | 320/101 |
| 2013/0154569 A1* | 6/2013 | Endo ..................... | H02J 7/0014 |
| | | | 320/128 |
| 2018/0013291 A1 | 1/2018 | Ohashi et al. | |
| 2018/0329382 A1 | 11/2018 | Somani et al. | |
| 2020/0119561 A1 | 4/2020 | McMorrow | |

* cited by examiner

SOLAR-BATTERY INTEGRATED DC SYSTEM

CROSS-REFERENCE TO RELATED APPLICATIONS

This application claims priority to U.S. Provisional Patent Application No. 63/090,810, filed Oct. 13, 2020, titled "SOLAR-BATTERY INTEGRATED DC SYSTEM," all of which are incorporated herein by reference in its entirety.

STATEMENT REGARDING FEDERALLY SPONSORED RESEARCH OR DEVELOPMENT

This invention was developed under Contract No. DE-NA0003525 awarded by the United States Department of Energy/National Nuclear Security Administration to National Technology & Engineering Solutions of Sandia, LLC, operator of Sandia National Laboratories; and partially under NSF Grants \#OIA-1757207 (NM EPSCoR), NSF HRD-1345232, NSF HRD-1914635. The Government has certain rights in this invention.

BACKGROUND OF THE INVENTION

The application generally relates to a solar photovoltaic battery integrated dc system. The application relates more specifically to a method for connecting and controlling a battery energy storage system to a new or existing, solar photovoltaic systems or other distributed energy resource.

Electric energy storage using batteries is rapidly becoming economical for commercial power distribution. Battery energy storage units typically require a battery charger and an AC inverter in order to connect the battery power to the AC power grid. However, these inverters are not configured to perform Maximum Power Point Tracking, or maximum power point tracking, which is the control method for photovoltaic (PV) powered inverters. Battery powered inverters rely on a droop control function for the parallel operation of inverters on the microgrid. Currently, conventional, commercially available PV powered inverters, also referred to as "COTS inverters", cannot be used with conventional DC batteries. For this reason, most battery energy storage systems must be operated independently of solar PV systems.

Prior art solutions for PV plus battery, grid connected, inverters are illustrated in FIGS. 1A through 1D. A conventional PV storage system 1 is shown in FIG. 1A. A PV array 10 is connected to an input terminal 16 via disconnect switch 12 to provide a DC input voltage to an inverter module 14. Inverter module 14 converts DC voltage to AC voltage to output terminals 20 at rated AC grid voltage via circuit breaker 22. In order to add energy storage batteries to system 1, an additional inverter 24 and a battery charger 26 must be connected in parallel with the output of inverter 14 as shown in FIG. 1B. Battery Inverter Droop 24 must be configured with a droop control function for controlling battery 30 and charger device 26.

FIG. 1C shows an alternate arrangement currently in use provides an inverter module 14 with droop control. Two converters 28, 29 are required, a first converter 28 to interface the PV array controlled via maximum power point tracking and a second converter 29 configured to interface the battery storage 30 and control the charge or discharge of the battery via droop control function. Another alternative configuration is shown in FIG. 1D. A solar PV energy storage 10 is connected in parallel with a battery 30 to provide DC input voltage by the use of a multiple input inverter 33.

The prior art solutions fail to provide a PV energy storage system that can be parallel connected with a battery storage system for use with an existing solar power system using conventional inverters intended for solar photovoltaic systems. Also lacking is a complete energy storage combination package that can be provided at a lower cost, and/or as a means to connect a battery to the grid using a conventional solar photovoltaic inverter configuration.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a converter for controlling current flow on a DC bus. The converter includes a pair of input terminals for receiving a DC battery voltage. A switching module controls a bi-directional current flow through the battery. The switching module has output terminals, and voltage and current_sensors for measuring PV Voltage and Current. A micro-controller via a control path controls the switching module. The switching module has output terminals, and voltage and current_sensors connected across the output terminals. A control path controls the switching module. The control path includes a current generator to generate a reference current in response to a reference voltage detected by the voltage sensor. A comparator is connected at the output of the current generator. The comparator compares the reference current with a battery current and outputs a signal to a controller module. The controller module generates a duty cycle value. A pulse width modulating generator receives the duty cycle value and modulate the switch module to control current flow and energy flow between the DC bus and the battery. The DC bus is further connected to a PV array to power an inverter load connected to the DC bus.

Another embodiment relates to a DC power system for integrating a solar PV array with a battery power source. The DC power system includes a solar PV array and a converter connected in parallel on a DC bus for powering an inverter. The converter is connected to a battery to provide DC power to the DC bus. The converter includes input terminals for receiving a battery DC voltage. A switching module controls bi-directional current flow through the converter. The switching module includes output terminals and a voltage sensor connected across the output terminals. The switching module includes output terminals and a current and voltage sensors to measure Battery Voltage and Current and PV Voltage and current. A micro-controller via a control path controls the switching module. The control path includes a current generator to generate a reference current in response to the reference voltage. A comparator connected at the output of the current generator compares the reference current with a battery current and outputs a signal to a controller module. The controller module generates a reference value. A pulse width modulating generator receives the reference value and modulates the switch module to control current flow and energy flow between the DC bus and the battery.

Another embodiment relates to a method for controlling a DC to DC converter includes connecting a DC battery source at an input to the DC/DC converter; connecting a DC bus at an output of the DC/DC converter; sensing an output voltage of the converter; generating a reference current in response to the reference voltage; measuring an output current of the DC battery source; comparing the reference current to output current of the DC battery source; generating a reference value in response to the compared reference and DC battery source current values; and modulating the switch module in response to the reference value to control a current flow and an energy flow bi-directionally between the DC bus and the battery.

Certain advantages of the embodiments described herein include the invention is specifically suited to implementing a solar photovoltaic plus battery energy source that can be tied to the grid using commercially available photovoltaic inverters or micro-inverters with arbitrary resource management characteristics including peak power tracking, droop, etc. Such a system benefits electrical power consumers through cost savings as well as smaller footprint and simpler grid connection.

As such, an improved, universal system and method is disclosed herein to implement a solar photovoltaic system (solar PV system) and battery system that can be used with an existing solar PV system, as a complete package, or as a means to connect a battery to the grid using Commercial Off the Shelf (COTS) inverters intended for solar PV system, or as a means to connect distributed resource using COTS inverters. A battery, SPS and DC/DC converter system, as disclosed herein, may be connected to any inverter.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which.

DETAILED DESCRIPTION OF THE INVENTION

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

Figure 1A:
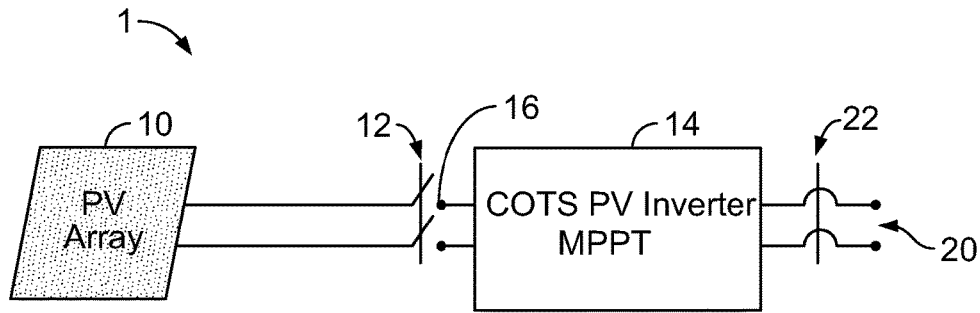
FIG. 1A shows a prior art solutions for PV plus battery, grid connected, inverters.
Figure 1B:
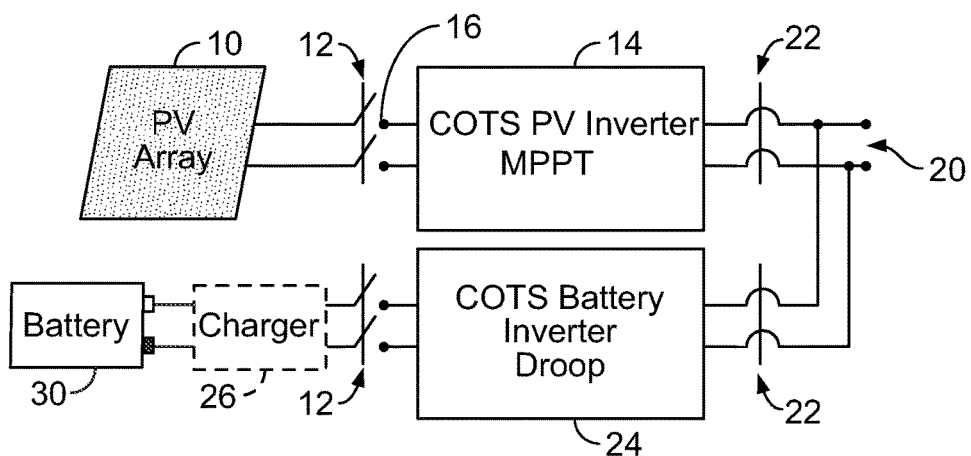
FIG. 1B shows another prior art solutions for PV plus battery, grid connected, inverters.
Figure 1C:
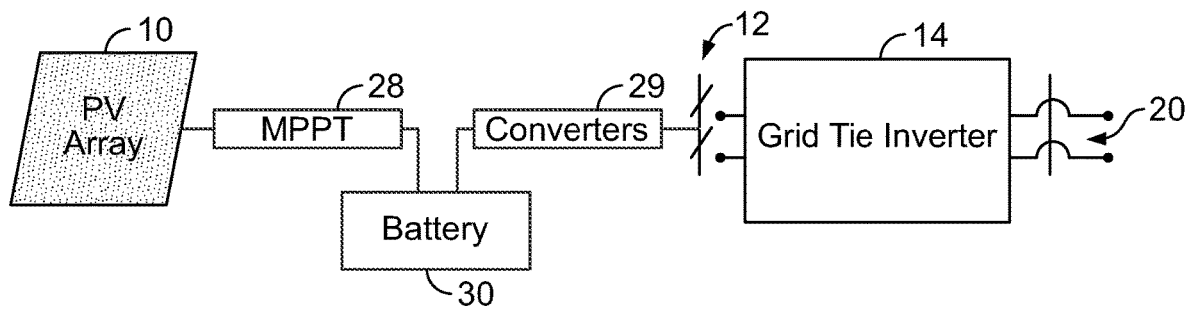
FIG. 1C shows another prior art solutions for PV plus battery, grid connected, inverters.
Figure 1D:
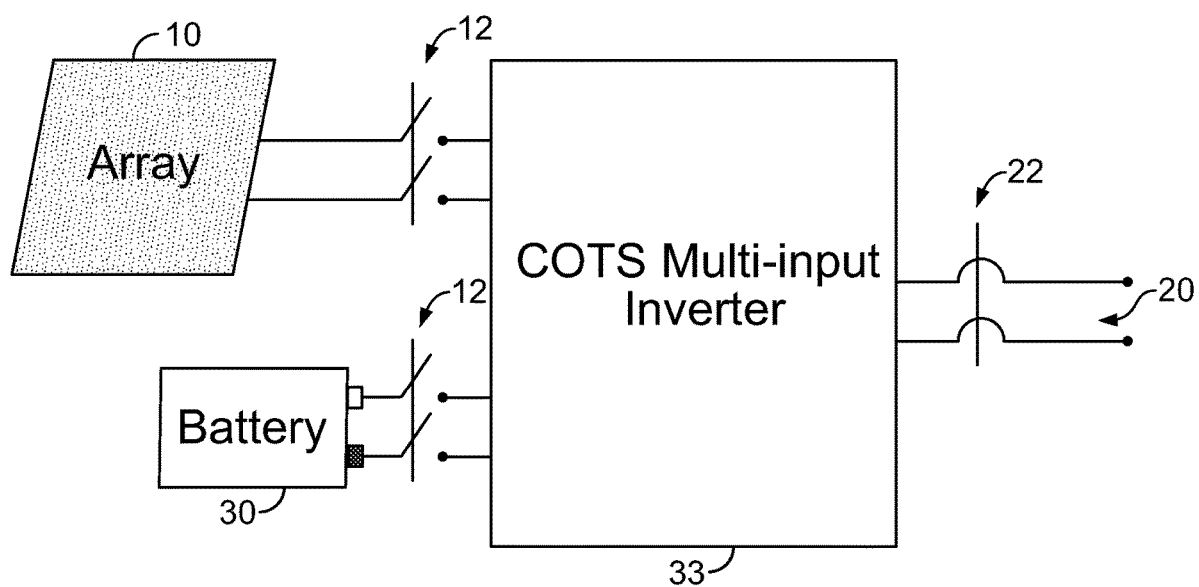
FIG. 1D shows another prior art solutions for PV plus battery, grid connected, inverters.
Figure 2:
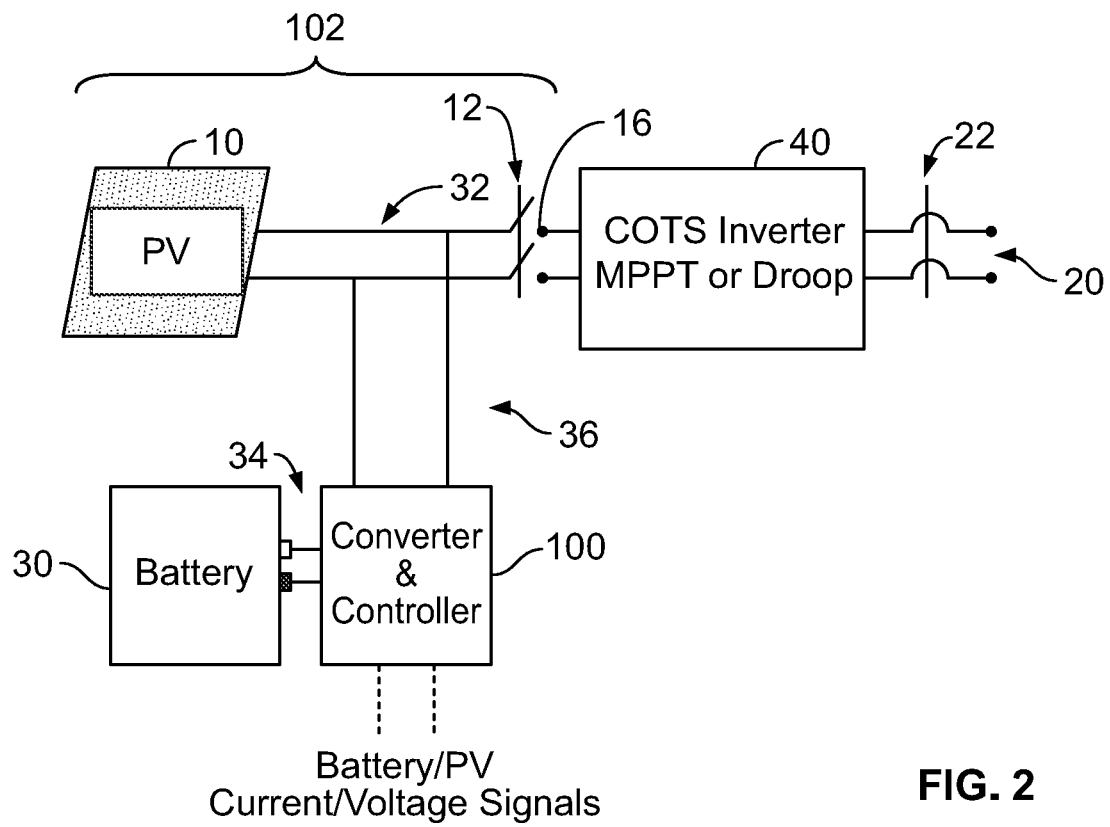
FIG. 2 shows an exemplary embodiment of the system in the present invention.

Referring to FIG. 2, a combination solar-battery integrated DC system 102 and inverter 40 is shown. PV array 10 is connected to a DC bus 32, and in parallel with a DC/DC converter and controller, which may be referred to as controller 100. PV array 10 is constructed from multiple electrically interconnected solar panels (not shown) to produce DC power provided to the DC bus 32. PV array 10 and the solar panels are characterized by a maximum or peak power point, i.e., the maximum power, current, voltage, and energy levels that array 10 can generate. The maximum power point of PV array 10 may vary depending on the amount of incident sunlight, cloud cover, and temperature. Inverter 40 receives dc power and provides ac power to output terminals 20 that may be connected to a grid or a local load as further discussed below.

The controller, 100, is a critical part of this application and consists of hardware and software. Its singular purpose is to make the combination of the PV array and battery behave in a manner that the COTS inverter (40) expects. For example, a photovoltaic inverter expects the input to be a photovoltaic source and will determine, or track, the maximum power point. The inverter 40 continually adjusts its operating condition, voltage and current, to operate at the maximum power point tracking, thereby extracting the maximum power and energy available from PV array 10 at any instant. The controller 100 must make the combination of the PV and battery 'look like' a PV array with a well-defined maximum power point, corresponding to the power desired by the user for the possible operating modes: 1. PV Only 2. Battery Only 3. PV charging battery with remaining power going to inverter 4. PV and Battery both supplying power to inverter. This enables the use of any COTS inverter.

Inverter 40 converts the input DC voltage to an AC output voltage to connect the PV array to a load or user, a utility power grid, or a combination of these, so that the solar PV system 102 can supply power locally or to the electric utility power distribution grid. Inverter 40 includes maximum power point tracking or droop control that allows it to continually adjust the inverter operating condition, voltage and current to the output terminals 20. Maximum power point tracking functionality allows inverter 40 to operate at the maximum power possible at any time, and therefore produce the maximum energy, when the input is a PV array. Droop is appropriate for a battery.

DC/DC or battery converter 100, which may be generally referred to as converter 100 is preferably a DC/DC bidirectional converter with controls as described in greater detail below, with respect to FIG. 1. Converter 100 also includes a controller function that makes the combination of the PV array and battery behave in a manner that the COTS inverter (40) expects, as explained previously. Converter 100 includes sensing circuitry (FIG. 2) to adjust its output voltage to match DC bus 32 and connect via separate conductors 36 to DC bus 32. DC bus is connected to inverter 40 via switch 12 at input terminals 16. The sensing circuitry includes measurement of Battery Voltage and Current and PV Voltage and Current. Battery 30 provides DC voltage at the input terminals 34 to converter 100. Battery 30 may also receive DC voltage from converter 100 to charge battery 30.

Figure 3:
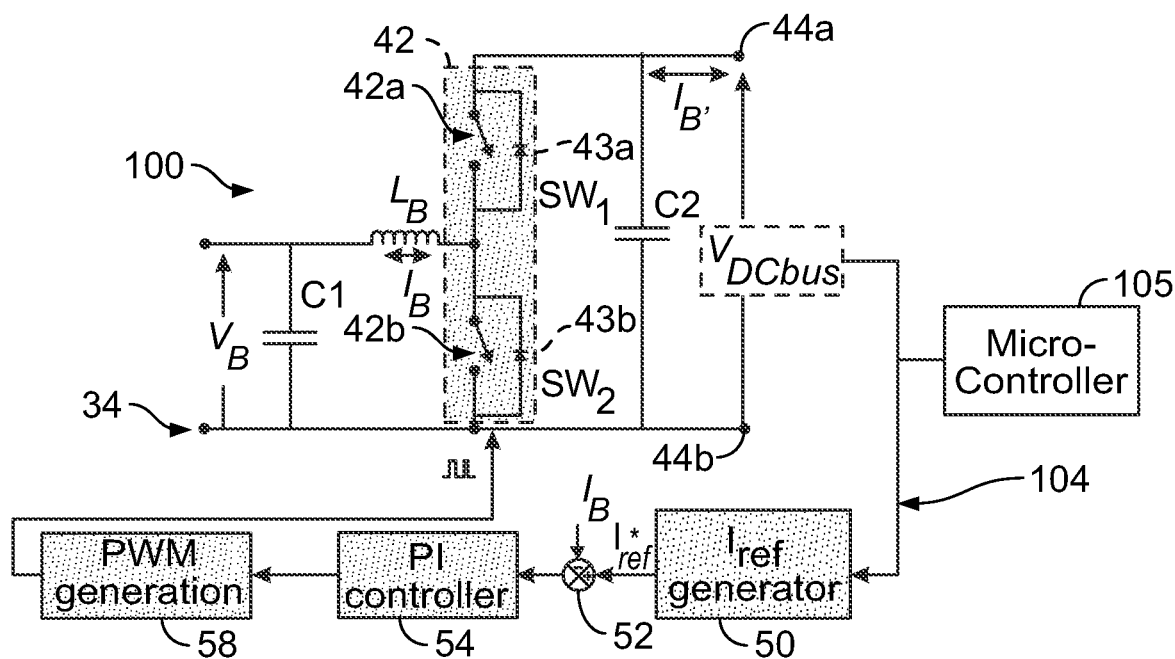
FIG. 3 shows a schematic diagram of the bi-directional converter circuit of FIG. 2.

FIG. 3 shows the overall circuitry of a bi-directional converter 100 according to an embodiment of the disclosure. A control diagram 104 of converter 100 indicates the feedback control path configuration for controlling converter 100. Converter 100 has input terminals 34 for receiving a DC battery voltage $V_B$ from battery 30. $V_B$ is filtered via a parallel capacitor, C1, and series inductor $L_B$, to filter harmonics and other ripple frequencies from battery current $I_B$ provided by $V_B$. $I_B$ flows through $L_B$ to a solid-state switching module 42 indicated by dotted lines. $I_B$ is filtered at output terminals 44a, 44b by output capacitor C2, and flows to or from the DC bus as required.

Switching module 42 is controlled by control path 104 for distributing a bi-directional flow of power into and from battery 30. When PV array 10 is generating energy that is not required on the grid, power from DC bus is used to charge battery 30. When DC bus voltage drops below a predetermined output voltage available from PV array 10, or at nighttime, or if the PV array is disconnected for any reason, or if additional energy is required by the grid, current IB is reversed to support the DC bus voltage and provide power to inverter 40 (see FIG. 2).

Referring back to FIG. 3, control path 104 senses the DC bus voltage $V_{DCbus}$ present across terminals 44a, 44b, and $V_{Dcbus}$ is input to $I_{ref}$ generator 50 to generate a reference current $I_{ref}$. $I_{ref}$ is compared with the battery current $I_B$ at comparator 52, and the difference between $I_{ref}$ and $I_B$ is input to a proportional-integral (PI) controller 54 to generate a reference current value. The reference current value is input to a PWM generator 58, to modulate switch module 42 and control current and energy flow between DC bus 32 and battery 30. Switch module 42 includes a pair of directional switches 42a and 42b. Each directional switch 42a, 42b, includes a parallel-connected diode 43a, 43b, respectively.

Referring back to FIGS. 2 and 3, the solar-battery integrated DC system 102 and methods for implementing the solar PV system in parallel with a battery system, such as exemplary shown as 30, may be used with an existing solar PV system as a package to connect battery 30 to the grid using COTS inverters designed for a connecting a solar PV system, such as exemplary represented by PV array 10.

DC/DC converter 100 is bidirectional, i.e., it can charge the battery using some of the current from the array or discharge the battery, adding to the current and power from the array. Converter 100 can be arranged in a variety of known bidirectional converter topologies in power electronics. In the present invention the converter control path 104 creates a synthetic peak power point that the inverter now follows. The peak power point is synthesized based on an external command that determines whether the battery is to charge or discharge and at what power or current rate. The control path 104 and bi-directional converter 100 enables COTS PV inverters to be used with battery energy sources and PV array. COTS PV inverters are an extremely mature, economical, and readily available product.

Solar PV system 102 may be connected to an inverter. A battery and the DC/DC converter may be physically mounted to the solar PV system 102. In another embodiment, the battery and the DC/DC converter are mounted under the solar PV system and act as a ballast. In an embodiment, the battery may be an alkaline battery. Alkaline batteries advantageously require minimal or no battery management or temperature control. An alternate embodiment may use a zinc/manganese dioxide ($ZnMnO_2$) based battery to allow the batteries to be mounted under the solar panels. The ability of such batteries to operate without a battery management system and temperature control, as are necessary for Li-ion batteries, and to be fabricated with any form factor provide important advantages. In yet another embodiment, Li-ion batteries may be used.

Figure 4:
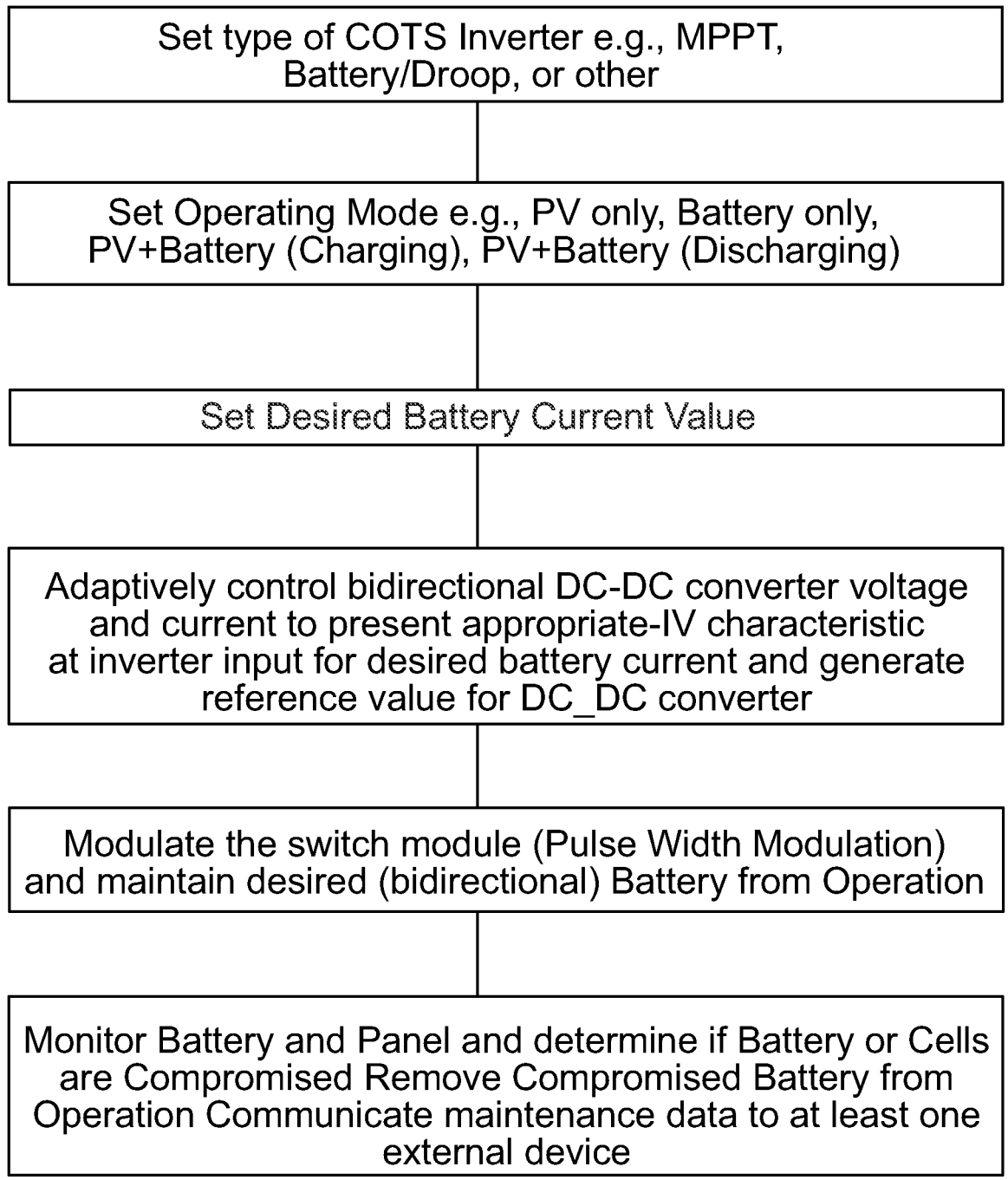
FIG. 4 shows a partial exemplary flow diagram for the control system.

The controller 100 includes a component or module micro-controller 105 to controls the various components via control path 104 to perform the steps as shown in the flow diagram set forth in FIG. 4. The steps shown on FIG. 4 are:

1. Set type of COTS Inverter, e.g., MPPT, Battery/Droop, or other
2. Set Operating Mode, e.g., PV only, Battery only, PV+Battery (Charging), PV+Battery (Discharging)
3. Set Desired Battery Current Value
4. Adaptively control bidirectional DC/DC Converter voltage and current to present appropriate I-V characteristic at inverter input for desired Battery current and generate reference value for DC/DC converter. The I-V, i.e., Current-Voltage characteristic, describes the behavior of voltage and current at the input terminals of the inverter. The converter is controlled to make this I-V characteristic like that of a PV panel with a maximum power corresponding to the desired reference current, or a droop characteristic corresponding to desired current.
5. Modulate the switch module (Pulse Width Modulation) and maintain desired (bidirectional) Battery current
6. Modulate the switch module (Pulse Width Modulation) and maintain desired (bidirectional) Battery current
7. Monitor Battery and Panel and determine if Battery or Cells are Compromised
8. Remove Compromised Battery from Operation
9. Communicate maintenance data to at least one external device.

Additionally, the micro-controller 105 may be programmed to perform one or more of the additional functions: a. monitor battery and PV Array health; b. remove a compromised battery from operation; and c. communicate with external devices for purposes of maintenance.

In the event of a utility shutdown or fault on the AC grid, the maximum power of the solar-batter PV system 102 may be applied to charge the battery 30 with the inverter 40 isolated from the AC grid.

The battery converter 100 may also be controlled as a virtual capacitor to provide a low frequency ripple to the inverter for single phase applications to improve the reliability of the system.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any machine-readable media for accomplishing its operations. The embodiments of the present application may be implemented using an existing computer processor, or by a special purpose computer processor for an appropriate system, incorporated for this or another purpose or by a hardwired system.

It is important to note that the construction and arrangement of the solar-battery DC integrated system, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application includes a micro-controller that includes a computer program product comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, SD card, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions comprise, for example, instructions and data which cause a general-purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule-based logic and other logic to accomplish the various connection steps, processing steps, comparison steps and decision steps.

The invention claimed is:

1. A solar-battery integrated DC system for controlling current flow on a direct current (DC) bus, comprising:
    a controller comprising:
        a pair of input terminals for receiving a DC battery voltage from a battery;
        a switching module for controlling a bi-directional current flow between the battery and the DC bus, the switching module having a pair of output terminals and photovoltaic (PV) and Battery voltage and current sensors;
        a control path for controlling the switching module, the control path comprising:
            a current generator to generate a reference current in response to a reference voltage detected by the voltage sensor; and
            a comparator connected at the output of the current generator, the comparator configured to compare the reference current with a battery current and output a signal to a controller module; the controller module configured to generate a reference value; and
            a pulse width modulating generator configured to receive the reference value and modulate the switch module to control current flow and energy flow between the DC bus and the battery to adjust the controller output voltage to match the DC bus;
        wherein the DC bus is further connected to a PV array; and
        wherein the DC bus is connected to an inverter, the inverter controlling alternating current (AC) to inverter output terminals.

2. The system of claim 1, wherein the controller module is a proportional-integral controller.

3. The system of claim 1, wherein the controller comprises a micro-controller, the micro-controller programmed to:
    a. Set type of conventional off-the-shelf (COTS) Inverter
    b. Set Operating Mode
    c. Set Desired Battery Current Value
    d. Adaptively control bidirectional DC/DC Converter voltage and current to present appropriate Current-Voltage characteristic at inverter input for desired Battery current and generate reference value for DC/DC converter
    e. Modulate the switch module and maintain desired battery current direction.

4. The system of claim 3, wherein the micro-controller is further programmed to:
    1. Monitor Battery and determine if Battery or Cells are Compromised
    2. Remove Compromised Battery from Operation.

5. The system of claim 3, wherein the type of COTS inverter is selected from the group consisting of maximum power point tracking (MPPT) and DROOP.

6. The system of claim 3, wherein the Set Operating Mode is selected from the group consisting of PV only, Battery only, PV+Battery—Charging and PV+Battery—Discharging.

7. The system of claim 1, wherein the controller is configured to control the switching module to switch a power flow to charge the battery from the DC bus in response to sensing that the inverter is isolated from the alternating current (AC) grid.

8. The system of claim 1, wherein the converter is controlled to provide a low frequency ripple to the DC bus.

9. The system of claim 1, wherein the battery being connected in parallel with a first capacitor, and in series with an inductor; and the switching module having a first directional switch connected between the inductor and a first converter output terminal, and a second directional switch connected between the inductor and a second converter output terminal.

10. The system converter of claim 7, further comprising a second capacitor connected in parallel across the first directional switch and the second directional switch, and between the first converter output terminal and the second converter output terminal.

11. The system of claim 1, further comprising the switching module is controlled by the control path for distributing a bi-directional flow of power to charge battery in response to the PV array generating energy without an inverter connected load; and support the DC bus voltage when DC bus voltage drops below a predetermined output voltage.

12. A direct current (DC) power system, comprising:
   a solar PV array directly connected to a DC bus for powering an inverter;
   a battery connected to a controller, the controller directly connected to the DC bus;
   the controller comprising:
      a pair of input terminals for receiving a battery DC voltage from the battery;
      a switching module for controlling a bi-directional current flow, the switching module having a pair of output terminals and a voltage sensor connected across the output terminals;
      a control path for controlling the switching module, the control path comprising a current generator to generate a reference current in response to a reference voltage detected by the voltage sensor; and
      a comparator connected at the output of the current generator, the comparator configured to compare the reference current with a battery current and output a signal to a controller module; the controller module configured to generate a reference value; and a pulse width modulating generator configured to receive the reference value and modulate the switch module to control controller output voltage, current flow and energy flow between the DC bus and the battery so the controller output voltage matches DC bus voltage.

13. The system of claim 12, wherein the inverter is a conventional off-the-shelf (COTS) inverter that is controlled by a droop function.

14. The system of claim 12, wherein the inverter input is a conventional off-the-shelf (COTS) inverter that is controlled by a maximum power point tracking algorithm.

15. The system of claim 12, wherein the controller further comprises a micro-controller, the micro-controller configured to:

a. Set type of COTS Inverter
   b. Set Operating Mode
   c. Set Desired Battery Current Value
   d. Adaptively control bidirectional DC/DC Converter voltage and current to present appropriate Current-Voltage characteristic at inverter input for desired Battery current and generate reference value for DC/DC converter
   e. Modulate the switch module and maintain desired Battery current direction
   f. Modulate the switch module and maintain desired battery current direction.

16. The system of claim 12, wherein the controller is configured to control the switching module to switch a power flow to charge the battery from the DC bus in response to sensing a utility shutdown or fault on a connected alternating current (AC) grid, with the inverter isolated from the AC grid.

17. The system of claim 12, wherein the battery being connected in parallel with a first capacitor, and in series with an inductor; and the switching module having a first directional switch connected between the inductor and a first converter output terminal, and a second directional switch connected between the inductor and a second converter input terminal.

18. The system of claim 12, further comprising a second capacitor connected in parallel across the first directional switch and the second directional switch; and between the first converter output terminal and the second converter output terminal.

19. The system of claim 12, further comprising the switching module is controlled by the control path for distributing a bi-directional flow of power to charge battery in response to the PV array generating energy without an inverter connected load; and support the DC bus voltage when DC bus voltage drops below a predetermined output voltage.

* * * * *